Feb. 6, 1962 R. A. JONES 3,020,328
BATTERY CAP
Filed Oct. 12, 1959

INVENTOR.
Richard A. Jones
BY
His Attorney

3,020,328
BATTERY CAP
Richard A. Jones, Muncie, Ind., assignor to General Motors Corporation, Detroit, Mich., a corporation of Delaware
Filed Oct. 12, 1959, Ser. No. 845,837
2 Claims. (Cl. 136—177)

This invention relates to plug means for batteries and, particularly, to dual-purpose plug means for dry-charge batteries.

An object of this invention is to provide a new and improved plug means arranged with reversible fastening means to be convertible both to seal as well as to vent cells of a battery.

Another object of this invention is to provide a battery cap adapted to be fitted relative to a filler opening of a cover portion of a dry-charge battery case such that the cap in one direction of use provides a positive seal for protection against air, humidity, moisture and foreign material such as dust or metallic elements that may enter cells and deteriorate the dry-charge battery and its plate structure during shipping and storage in a dry condition prior to wet use thereof and in an opposite direction of use the same cap provides baffle means and venting to permit "breathing" and escape of electrolytic gases subsequent to filling and use with electrolyte and liquid in cells.

Another object of this invention is to provide a battery cap having a body portion completely closed off at one end and open at an opposite end such that first fastening means provided in the direction of the closed end can be fitted relative to a filler opening of a cover portion of a dry-charge battery in a manner for effecting positive sealing for protection against humidity, moisture and foreign material prior to wet use of the battery and such that second fastening means provided in the direction of the open end also can be fitted relative to the same filler opening to provide access to baffle and venting means that permit escape of electrolytic gases free of loss of the electrolytic fluid due to splashing during wet use of the dry-charge battery.

A further object of this invention is to provide a battery cap having a body portion completely closed off at one end and open relative to an opposite end such that first fastening means integral with said body portion in the direction of the closed end can be fitted relative to a filler opening of a cover portion of a dry-charge battery in a manner for effecting positive sealing for protection against humidity, moisture and foreign material prior to wet use of the battery and such that second fastening means integral with said body portion in the direction of the open end also can be fitted relative to the same filler opening to provide access to baffle means adjacent to vent passage means located and extending outwardly through the body portion in a position intermediate the first and second fastening means.

Another object of this invention is to provide a battery cap means having a body portion completely closed off at one end and open relative to an opposite end such that first and second portions of a fastening means integral with a laterally outwardly projecting annular web portion also integral with the body portion are provided and extend as annular sealing lips concentrically and coaxially extending in opposite directions relative to closed and open ends respectively of the body portion having an internal chamber formed by a cylindrical inner surface relative to which at least a pair of transverse partition members extend in angular positions relative to each other as baffle means in conjunction with laterally outwardly extending vent passage means provided in the web portion intermediate the first and second fastening means portions whereby the cap means at the closed end can provide a positive seal of the filler opening during shipping and storage of the battery in a dry condition and can provide for venting relative to the open end during wet use of the battery.

Further objects and advantages of the present invention will be apparent from the following description, reference being had to the accompanying drawings wherein preferred embodiments of the present invention are clearly shown.

Figure 1:
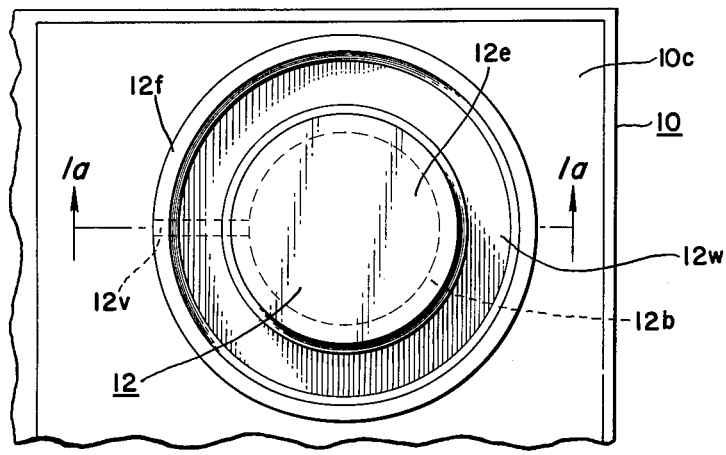
FIGURE 1 is a fragmentary top plan view of a dry-charge storage battery equipped with a cap means having features in accordance with the present invention.

FIGURE 1 illustrates a fragment of a dry-charge storage battery having a case generally indicated by numeral 10 relative to which one or more cells such as 10c are provided each containing plates known to deteriorate or to suffer damage affecting battery efficiency and life if not protected prior to filling of the cells with acid or electrolyte when the battery is to be put into use. Once the dry-charge batteries are manufactured, they are shipped and stored in a dry condition requiring humid atmosphere and other foreign material such as dust to be kept from the interiors of the cells. In accordance with the present invention, the dry-charge battery case 10 is fitted with a cap or plug means generally indicated by numeral 12.

Figure 1A:
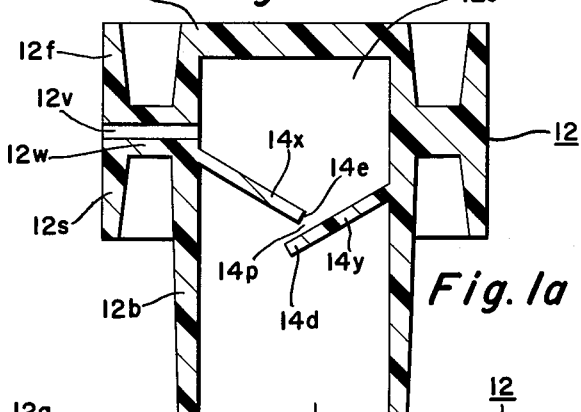
FIGURE 1a is a cross-sectional elevational view taken along 1a—1a of FIGURE 1.
Figures 2, 3:
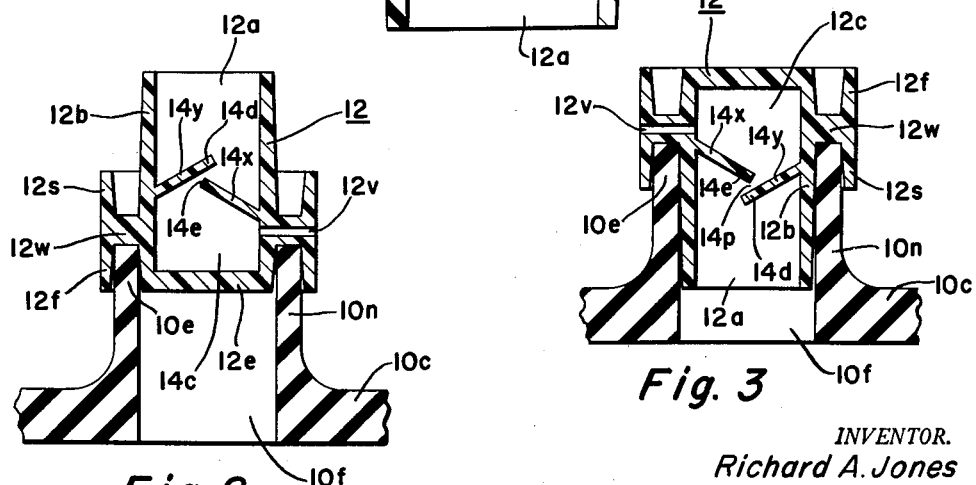
FIGURE 2 is a cross-sectional elevational view taken to show use of the cap means in FIGURES 1 and 1a for positive sealing of a filler opening during shipment and storage of a dry-charge storage battery in accordance with the present invention.
FIGURE 3 is a cross-sectional elevational view taken to show use of the cap means in FIGURES 1 and 1a for venting of a filler opening during wet use of a dry-charge storage battery in accordance with the present invention.

As best seen in FIGURES 1a, 2 and 3, the cap means includes a body portion 12b having substantially cylindrical inner and outer surfaces and forming an inner chamber 12c having an opening or aperture 12a at one end and a closed-over or covered end 12e remote therefrom. The open end has the aperture 12a opposite the closed or covered end 12e in between which there are baffle means including members 14x and 14y each integral with the body portion 12b. The member 14x of the baffle means extends transversely relative to inner chamber 12c and in an angular position relative to member 14y such that a baffle passage 14p is formed between an end 14e and a downwardly extending or depending portion 14d of members 14x and 14y respectively. The members 14x and 14y can be identified as first and second sectors respectively of the baffle means. The end 14e and depending portion 14d are substantially centrally located relative to the space or the chamber 12c inside the body portion 12b. The end 14e and the depending portion 14d are longitudinally and axially spaced from each other such that the passage 14p establishes communication between the open end 12a and the chamber or cavity 12c between the closed end 12e and baffle means. Extending outwardly from the chamber 12c on one side of the baffle means member 14x there is a laterally outwardly extending vent opening 12v formed as a passage means extending radially outwardly through the body portion 12b and further through an annular web portion 12w. This web portion 12w is integral with fastening means including a first annular lip or fastening portion 12f in a location toward the closed end 12e and a second annular sealing lip or fastening portion in a location toward the open or opposite end 12a and designated by a reference numeral 12s. The vent opening 12v is located in between or intermediate the first and second sealing lip portion 12f and 12s respectively.

FIGURE 2 illustrates use of the cap means 12 for positive sealing of a filler opening 10f in one cell 10c of the battery case 10. The filler opening 10f is defined in part by an annular neck portion 10n which projects upwardly from the cell 10c. The first sealing lip or fastening portion 12f as well as the web 12w and a part of an outer periphery of the body portion 12b sealingly engage an annular end portion 10e of the neck 10n. This sealing engagement occurs along the inner and outer periphery of the annular end 10e as well as along the upper edge or surface of the end 10e. The closed-off end 12e of the cap means 12 in conjunction with the body portion, web portion, and first annular sealing lip or fastening portion assure complete closure and protection of the filler opening 10f against air, humidity, moisture and foreign material such as dust as well as metallic elements that may enter the battery case during shipping and storage thereof.

FIGURE 3 illustrates the use of fastening means in a reverse relationship such that the second annular sealing lip or fastening portion 12s fits snugly around annular end 10e of the neck 10n of the cell 10c. The filler opening 10f can now communicate by way of the open end 12a and baffle passage 14p with the chamber 12c and vent opening 12v as illustrated in FIGURE 3; a seal occurs relative to the annular end 10e which is contacted by the second annular sealing lip or fastening portion 12s as well as by the web portion 12w and an outer peripheral surface portion of the body portion 12b of the cap means 12. Venting of gases and so called "breathing" can occur by way of the vent opening 12v, chamber 12c as well as the baffle passage 14p and opening 12a such that electrolytic fumes can escape from inside the cell but splashing fluid or electrolyte is prevented from escaping through the vent opening 12v due to the baffling effect of the sectors or members 14x and 14y. The sealing lip portions 12s and 12f are substantially symmetrical relative to a plane that can be passed centrally through the web portion 12w.

The cap means 12 of the present invention is preferably made of a resilient material, such as rubber polyethylene, polypropylene or other synthetic flexible plastics which are acid resistant and do not age harden appreciably and can be snap fitted, forced or spirally threaded snugly into engagement with the annular end 10e of the neck 10n of the cell 10c. The battery casing is also formed of acid-resistant material such as hard rubber. The first and second sealing lip portions can be individually shaped to be in accordance with a disclosure of Patent 2,896,007, Buskirk, belonging to the assignee of the present invention. It is to be noted that vent opening 12v can be set at an angle other than coincident with the lateral or horizontal web portion 12w. It is recommended that the cap means 12 be installed in the position shown in FIGURE 2 for sealing on a warm, recently assembled dry-charge battery cell so that upon cooling of air in the cell there is effected a contraction of gas therein such that a partial vacuum exists and atmospheric pressure on closed end 12e enhances the seal for protection purposes.

While the embodiments of the present invention as herein disclosed constitute preferred forms it is to be understood that other forms might be adopted.

What is claimed is as follows:

1. On a dry-charge storage battery having a case including a neck around an electrolyte and fluid filler opening, the combination therewith of a one-piece battery cap means including a unitary body of insulating material, sealing means integral with said body and having a laterally outwardly extending annular web portion as well as first and second annular sealing lip portions axially extending in opposite directions and each substantially concentric and coaxial relative to said body, said web portion specifically having therein a vent opening formed as part of passage means and extending radially outwardly through said body, baffle means including a pair of transverse partition members integral inside said body and extending in angular positions toward though spaced from each other so as to complete another part of passage means from said vent opening to an open end of said body, and a covered end integral with said body in a location opposite to that of said open end and to one side of said vent opening for protecting and shielding said baffle means and vent opening as the passage means against contamination of the filler opening both when the filler opening is shut off completely and when this filler opening is vented between said transverse partition members and vent opening to permit "breathing" and escape of electrolytic gases subsequent to filling and wet use with electrolyte and fluid in the battery case, one of said sealing lip portions together with said web portion serving to limit telescopic fit of said body about the neck of the battery case both during storage and shipment of the battery case in dry condition as well as during wet use thereof.

2. A one-piece battery cap means for specific use in combination with a filler opening in a case of only a dry-charge storage battery, comprising, a body of insulating material completely closed off at one end and open restrictively on an opposite end, sealing means integral with said body portion and including a laterally outwardly extending annular web portion as well as first and second annular sealing lip portions extending in opposite directions axially relative to each other and each substantially concentric and coaxial relative to said body though radially spaced therefrom, baffle means including a pair of transverse partition members integral inside said body and extending in angular positions toward each other, and vent-passage means formed in said body through the insulating material and extending laterally outwardly through said web portion in between said first and second sealing lip portions of said same body in a location on one side of said baffle means, said lip portions of said sealing means each having a shape to complement and fit the case adjacent to the filler opening which is positively and completely shut by said closed end of said body portion for protection and shielding against deterioration of the dry-charge battery when said sealing means are fitted to the case in one direction and which is still protected and shielded though vented through said vent-passage means, baffle means and open end to permit "breathing" and escape of electrolytic gases subsequent to filling and wet use with electrolyte and fluid in the battery case.

References Cited in the file of this patent

UNITED STATES PATENTS

| 1,329,181 | Holland et al. | Jan. 27, 1920 |
| 2,131,592 | Lange et al. | Sept. 27, 1938 |
| 2,861,118 | Rolph | Nov. 18, 1958 |
| 2,896,007 | Buskirk | July 21, 1959 |

FOREIGN PATENTS

| 362,719 | Great Britain | Dec. 10, 1931 |